United States Patent [19]

Steinle

[11] 4,093,822

[45] June 6, 1978

[54] LOUDSPEAKER PROTECTION CIRCUIT

[75] Inventor: Günter Steinle, Monchweiler, Germany

[73] Assignee: Dual Gebrüder Steidinger, St. Georgen, Schwarzwald, Germany

[21] Appl. No.: 783,416

[22] Filed: Mar. 31, 1977

[30] Foreign Application Priority Data

Apr. 8, 1976 Germany ............................ 2615305

[51] Int. Cl.[2] ............................................... H02H 3/28

[52] U.S. Cl. ................................ 179/1 VL; 179/1 D; 361/58

[58] Field of Search .............. 179/1 VL, 1 D; 361/58, 361/33, 91

[56] References Cited

U.S. PATENT DOCUMENTS

| | | | |
|---|---|---|---|
| 3,423,636 | 1/1969 | Rowley | 361/58 |
| 3,529,210 | 9/1970 | Toshio Ito et al. | 361/58 |
| 3,890,465 | 6/1975 | Kaizu | 179/1 VL |
| 3,935,511 | 1/1976 | Boulanger et al. | 361/58 |

*Primary Examiner*—Douglas W. Olms
*Attorney, Agent, or Firm*—Martin A. Farber

[57] ABSTRACT

A circuit for connecting a loudspeaker combination having a treble loudspeaker to an amplifier with a control device for emphasizing the amplification in the range of the treble frequencies, comprising a positive temperature coefficient resistor connected in parallel to a fixed resistor. The parallel resistor combination is connected in series in the electrical connection means for the treble loudspeaker and substantially through the first-mentioned resistor has a value which during normal operation of the loudspeaker combination is smaller than that of the treble loudspeaker, and further has a temperature coefficient such that by exceeding of a permissible constant load voltage for the treble loudspeaker, its resistance value increases with respect to the treble loudspeaker such that the latter is not thermally overloaded. The fixed resistor limits the resistance increase of the resistor combination to a predetermined value.

2 Claims, 1 Drawing Figure

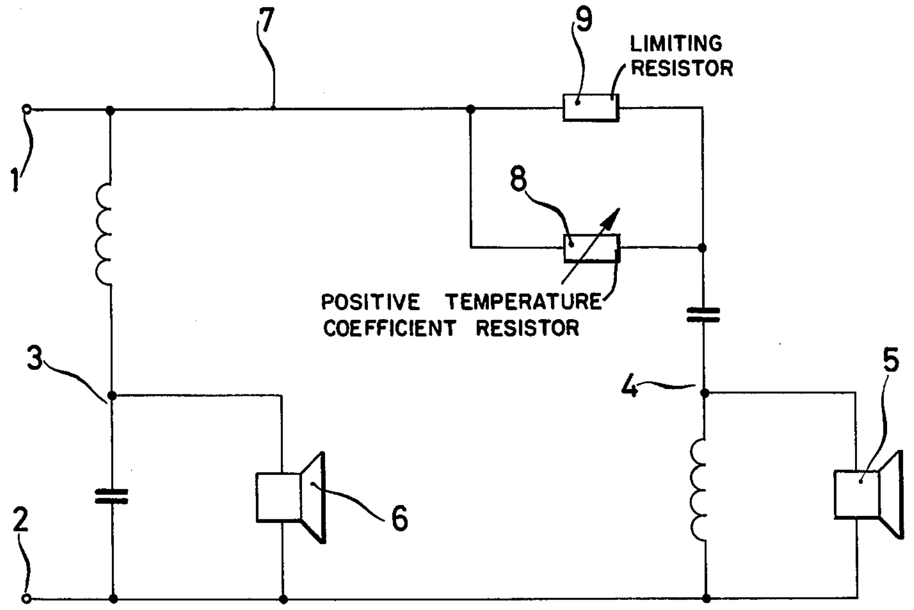
7
9
LIMITING
RESISTOR
1
8
POSITIVE TEMPERATURE
COEFFICIENT RESISTOR
3
4
5
2
6

LOUDSPEAKER PROTECTION CIRCUIT

The invention relates to a protection circuit, in general, and to a protection circuit against thermal overload of a loudspeaker combination which contains a treble loudspeaker, in particular.

Loudspeaker combinations as a rule are connected to amplifiers which makes possible pre-emphasizing or peaking of the high frequencies which is independent of the sound volume, whereby this emphasizing or intensification begins at approximately 1 kc/s and amounts to at 15 kc/s maximum about 20 db. With the usual tone or sound events to be reproduced, in the upper frequency range (which range is reproduced by the treble loudspeaker and begins at approximately 3 to 5 kc/s) only comparatively small amplitudes occur, so that this loudspeaker need be made available only for a comparatively small output, whereby even an emphasizing of the upper frequencies considering personal taste principally changes nothing. With a 50 watt amplifier the treble loudspeaker customarily is made available or laid out for an output of approximately 5 watts. If the amplifier is driven to full output with maximum adjusted treble control, the full amplifier output is overbalancingly received on the treble loudspeaker, by which the latter is considerably overloaded. Such type of settings or adjustments can take place unintentionally, and according to hearing are not recognized without more, because the emphasizing does not lie in the fundamental tone range. It has been generally known for a long time that for these reasons treble loudspeakers frequently are not usable.

For the overload protection of loudspeakers it is known to attach a thermal circuit-breaker on the loudspeaker (German Offenlegeschrift OS No. 2,356,731), which with a certain heating disconnects the circuit. According to another known arrangement (German Offenlegeschrift OS No. 2,217,523), it is known to place an excess current switch or line circuit breaker in the loudspeaker-circuit, which operates with a certain time delay.

Both of these arrangements have the disadvantage that they interrupt the current, which with the reproduction of a sound event is perceived as aesthetically disturbing.

In addition an electronic- and therefor a -device acting practically without delay (OS No. 2,217,523) is known, by means of which during the occurrence of a certain amplitude magnitude, the loudspeaker is short circuited. Consequently, indeed high voltage peaks are kept away which can cause a breakdown or interference with loudspeakers of a certain type of construction, not however too high a continuous power output, because if the limitation on the amplitude magnitude of the permissible constant load were set, then also those larger amplitudes which act only for short-times and which are harmless for the thermal loading, are also suppressed and consequently cause distortion.

To design the treble loudspeaker correspondingly large according to load, considering that the oscillating weight is to be held small, is either not possible or would be correspondingly disadvantageous and expensive.

It is known to use so-called PTC-resistors for heat protection circuits. These are resistors with a positive temperature coefficient, the resistance value of which considerably increases onward of a certain temperature.

However the types found on the market are not suitable without more for use with loudspeakers.

The present invention is based on the object to provide a heat protection circuit for the treble loudspeaker, which is simple and which operates with response times which are proper according to the art, without interrupting the loudspeaker current or evoking non-linear distortions.

It is another object of the present invention to aid the solution of the first mentioned object by providing a protection circuit against thermal overloading of a loudspeaker combination which contains a treble loudspeaker, characterised in the manner that in the circuit of the treble loudspeaker (5) there is connected a resistor (8) with positive temperature coefficient, the resistance value of which during normal operation is lower than that of the loudspeaker (5) and the temperature coefficient of which is selected such that the resistance value during exceeding of the permissible constant load current for the treble loudspeaker (5) increases in such a measure up to multiples of that of the loudspeaker (5) such that the loudspeaker current does not exceed the limit of the thermal loadability thereof, which from this, brings about the result that corresponding to the constructive structure of the loudspeaker (5) only a predetermined average current is permitted over a predetermined time, and that a limiting resistor (9) is connected in parallel to the resistor (8), the limiting resistor (9) having a fixed value which limits the increase of the resistor (8).

It is another object of the present invention to provide a protection circuit in accordance with the above-mentioned object, further characterized in that the limiting resistor (9) is so sized or proportioned such that with a maximumly set or adjusted high-frequency emphasis on the amplifier, its voltage drop is so large that the high-frequency emphasis of the amplifier is again substantially cancelled.

It is yet still a further object of the present invention to provide a protection circuit in accordance with the features set forth in the claims.

With the above and other objects and advantages in view, the present invention will become more clearly understood in connection with the following detailed description of a preferred embodiment when considered with the accompanying drawing, of which the only figure illustrates a circuit diagram of a loudspeaker-combination in accordance with the present invention.

Referring now to the drawing, from the input plugs or terminals 1, 2 of the loudspeaker combination in accordance with the present invention, which is connectable to the output of an amplifier, a tweeter or treble loudspeaker 5 and a middle-low-pitched loudspeaker 6 are connected via corresponding loudspeaker dividing networks 3, 4, respectively. A resistor 8 having a positive temperature coefficient is connected in the feed line 7 to the treble loudspeaker 5. A limiting resistor 9 is connected in parallel to the resistor 8.

During normal operation, that is if the treble loudspeaker 5 is operated below its maximum load or load limit, the temperature-dependent resistor 8 for example of 0.6 ohms is practically without influence on the treble loudspeaker 5 with 5 ohms. If higher outputs occur only for short times, the temperature-dependent resistor 8 is heated only slightly and likewise the moving or voice coil of the treble loudspeaker 5. The resistor 8 is now sized or proportioned with respect to its heat loss or emission such that if the average load lies a longer time over the maximum permissible output for the treble loudspeaker 5, the resistance value of the resistor 8 is considerably increased, and indeed so quickly that a further heating of the moving coil or voice coil of the treble loudspeaker 5 does not occur; that is by means of the increasing voltage division ratio, the output on the voice coil is not increased in spite of the current increase. By means of the parallel connected limiting resistor 9, the action of the temperature-dependent resistor 8 is now limited.

This has the result that with respect to time, there occurs a particularly advantageous course of the performance of the protective circuit. With increasing current in the high tone or treble circuit 7, the temperature-dependent resistor 8 rapidly changes its temperature only up to a certain predetermined limit and then only yet very slightly, that is, its heat capacity practically no longer increases with the current onward of a certain limit. The consequence of this is that it can quickly cool again to an ineffective resistance value, even after a longer overload stopping in the treble part, when the overloading ceases. In this manner it is possible after re-setting or cancellation of an erroneous high-frequency treble setting, to immediately obtain the sound impression corresponding to the true setting, or when a moving or passing overloading only occurs for a short time by a strong high-frequency portion in the music, because furthermore a strong high-frequency emphasis is set, which takes place readily intentionally with certain types of music, thus after subsiding of these short-time moving high-frequency portions, the set sound impression is again received relatively quickly. Consequently not only is a disturbance-free or interference-free protection circuit provided for the treble loudspeaker, but simultaneously, also automatically, an acoustic correction takes place, since a full high-frequency emphasis or intensification with the amplifier driven to full output is also, with consideration of an individual preference for high-frequency emphasis, in any case false.

A particularly advantageous sizing or proportioning of the limiting resistor 9 resides in selecting it precisely so large such that it again cancels the maximum high-frequency emphasis, which the amplifier permits by setting or adjustment. The advantageous characteristics with respect to the time behavior of the temperature dependent resistor are thereby not lost. If for example one starts out with a treble loudspeaker 5 having a resistance of 4 ohms and the loudspeaker combination connected to an amplifier whose high-frequency emphasis (which is independent of the sound volume) amounts as usual to a maximum of 20 db, which corresponds to a voltage ratio of 1 : 10, thus this high-frequency emphasis is exactly cancelled when the limiting resistor 9 has 40 ohms. Consequently in addition to the protection effect, an extreme erroneous setting or misadjustment is automatically corrected also with respect to the accoustics to the correct degree, because with full sound volume an exact frequency response or amplitude-frequency characteristic is correct in any case, and since the treble loudspeaker customarily is sized or proportioned such that it also is not overloaded with music with the highest possible high-frequency components with full output driving of the amplifier, it remains with maximum function with such a selected resistor even over the entire time of an erroneous operation, in which it can be operated unlimitedly or for an unlimited period.

It is to be understood that the disclosed embodiment is given by example only and not in a limiting sense.

I claim:

1. A circuit for connection of a loudspeaker combination to an amplifier with a control device for emphaisizing the amplification in the range of the treble frequencies, comprising, a first loudspeaker means for reproduction of low and middle tone frequencies, first electrical connection means for connecting said first loudspeaker means for reproduction of the low and middle tone frequencies to the amplifier, a second loudspeaker means for reproduction of high-pitch frequencies, second electrical connection means for connecting said second loudspeaker means for reproduction of the high-pitch frequencies to the amplifier, a first resistor with positive temperature coefficient, a second resistor with a fixed resistance being connected in parallel to said first resistor with positive temperature coefficient, thereby constituting a parallel resistor combination, said parallel resistor combination being connected in series with said second electrical connection means for connecting said second loudspeaker means and substantially via said first resistor having a value which during normal operation of the loudspeaker combination is smaller than that of said second loudspeaker means for reproduction of the high-pitch frequencies, and further having a temperature coefficient such that by exceeding of a permissible constant load voltage for said second loudspeaker means its resistance value increases with respect to said second loudspeaker means such that said second loudspeaker means is not thermally overloaded, whereby said second resistor limits the resistance increase of said resistor combination to a predetermined value.

2. The circuit as set forth in claim 1, wherein said second resistor limits said resistor combination to a value such that with a maximum adjusted high-frequency emphasis on the amplifier, the voltage drop on said resistor combination is so large such that it essentially again cancels the maximum adjusted high-frequency emphasis on the amplifier.

* * * * *